United States Patent [19]

Ellis

[11] 4,454,655

[45] Jun. 19, 1984

[54] DRILL PIPE MEASURING TOOL

[75] Inventor: Jim E. Ellis, Houston, Tex.

[73] Assignee: Hillard C. Van Zandt, Odessa, Tex.

[21] Appl. No.: 359,606

[22] Filed: Mar. 18, 1982

[51] Int. Cl.³ .............................................. G01B 3/12
[52] U.S. Cl. ................................ 33/141 G; 33/178 F
[58] Field of Search .............. 33/141 G, 178 F, 141 R

[56] References Cited

U.S. PATENT DOCUMENTS

| | | | |
|---|---|---|---|
| 2,245,221 | 6/1941 | Nudson et al. | 33/141 G |
| 2,292,938 | 8/1942 | Hennessy | 33/141 G |
| 3,134,175 | 5/1964 | Potts | 33/141 G |
| 4,163,323 | 8/1979 | Bud | 33/141 R |

*Primary Examiner*—Willis Little
*Attorney, Agent, or Firm*—Sixbey, Friedman & Leedom

[57] ABSTRACT

A distance measuring tool is provided for measuring the length of a drill pipe maintained under tension within a well. The tool includes a unitary instrumentation and instrument drive module which is sealed within an instrument housing and which may be removed and replaced as a single unit when malfunction occurs. The moving parts of the module are sealed in lubricating fluid, and a pressure equalization system is provided to equalize the pressure of the lubricating fluid relative to the external drilling mud pressure. The instrumentation and instrument drive module includes a mechanical distance counter and a drive mechanism which drives the counter only when the tool is descending into a drill pipe. The instrumentation within the tool is protected against impact by a shock absorbing nose assembly which includes both mechanical spring and hydraulic shock absorbing units. The shock absorbing nose assembly is mounted for limited universal movement on the tool housing to guide the tool over obstructions in the pipe.

14 Claims, 5 Drawing Figures

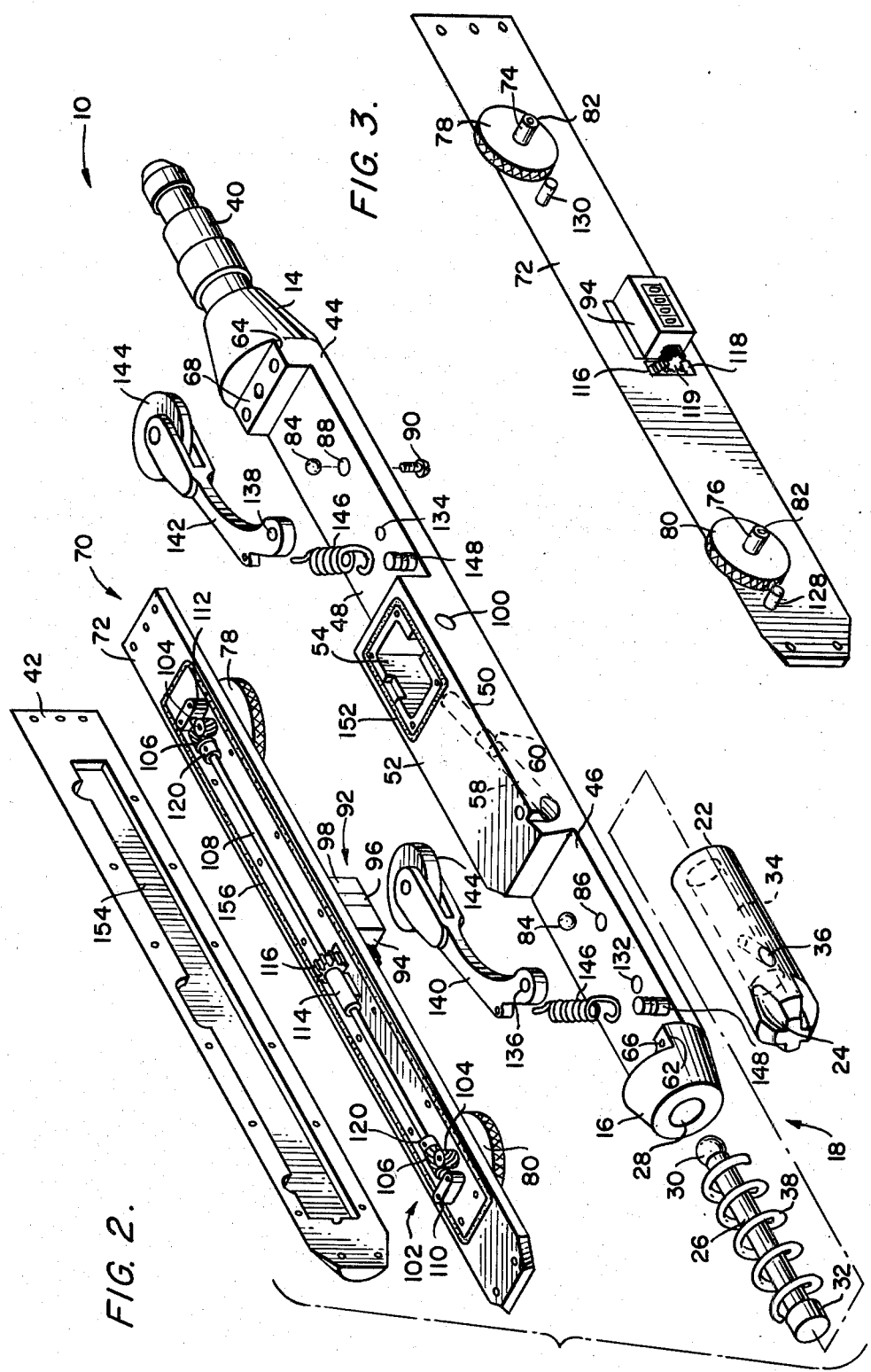

DRILL PIPE MEASURING TOOL

TECHNICAL FIELD

The present invention relates generally to distance measuring instruments and more particularly to an improved well measuring tool adapted to accurately measure the depth of a well without being subject to errors caused by pipe stretch.

BACKGROUND ART

During the drilling of an oil well, it is necessary to periodically determine the distance that the well has progressed. Such distance measurement would appear to be a relatively simple task, but in the environment of an oil well, the accomplishment of this measurement is both time consuming and expensive, and the results obtained by conventional measurement techniques are normally far from accurate.

One method presently used to determine downhole distance in an oil well is to measure the length of drill pipe which has been inserted into the well. To accomplish pipe measurement as the pipe is withdrawn from the well to change bits, the length of each stand of pipe is measured by hand using a steel tape. Not only is this method time consuming, but pipe stretch also contributes to the inaccuracy of the measurement so derived. A long length of pipe expands or stretches within a well, but when the pipe is withdrawn and the pressure and tension to which it has been subjected are withdrawn, the pipe will contract. In a deep well, the degree of pipe stretch occuring is significant, and it is impossible to determine the added length contributed to the pipe by pipe stretch downhole when the pipe is withdrawn and measured at the surface.

Similar errors due to stretch occur when attempts are made to make downhole distance measurements by dropping a weighted line or other elongated flexible measuring device into the well. As the line length increases, the resultant stretch error has also been found to increase.

Ideally, the length of a drill pipe should be measured without withdrawing the pipe from the well, for a measurement of this type would measure the actual length of the stretched pipe under tension in the well and would thus provide an accurate measurement of well depth. For example, if a simple roller type distance measuring unit wherein a roller is used to drive a simple mechanical counter could be passed down the interior of a well pipe, an accurate distance measurement might be obtained. Unfortunately, the distance measuring instruments known to the prior art are usually not capable of withstanding the conditions existing within thousands of feet of drill pipe. For example, the drill pipe will be filled with drilling mud under pressure, and such mud constitutes an abrasive and highly destructive agent if it is permitted to contact the mechanical components of a distance measuring unit. If the drilling mud weighs 10 lbs. per gallon, the hydrostatic pressure of the mud will reached 5,200 psi at ten thousand feet. Th viscous mud at these pressures will be forced into the casings of mechanical counters and gears used in prior art measuring units to inhibit operation and destroy the accuracy of any measurement taken.

Even if the destructive action of drilling mud under high pressures is avoided, no mechanical distance measuring unit is available which will provide accurate measurements while traversing the discontinuities in the interior contour of a drill pipe caused by the joints between pipe sections and withstand the impacts which result when the weighted instrument strikes downhole obstructions. Also, known measuring units are not designed to function within a drill pipe while simultaneously facilitating the passage of drilling mud around and past the instrument.

In the past, a drill pipe measuring unit has been designed with some recognition of the environmental hazards which will affect the unit, such unit being illustrated in U.S. Pat. No. 2,245,221 issued to Thomas T. Nudson et al. This patented measuring unit is adapted to descend through the drilling mud within a drill pipe with rotatable counter traction drive gears in contact with the internal surface of the pipe. A counter or registering mechanism is mounted within a sealed chamber, and the pressure within the chamber is equalized with changing external well pressures in the course of movement of the measuring unit to various well depths.

The Nudson et al unit effectively isolates the distance measuring counter from external drilling mud, but has no provision for protecting the drive gears which are essential to counter operation. These drive gears are completely exposed to both the high pressure drilling mud and the cuttings present in the mud, and these cuttings will operate to clog and terminate operation of the drive gears. Additionally, the drive gears of the patented unit drive the counter during both the descent and ascent of the unit within the drill pipe, thereby increasing the likelihood of error in the resulting measurement. If an accurate measurement is achieved during the descent, the results of this measurement can be destroyed if the counter drive gears are jammed by a cutting during the ascent. Finally, if the drive train in the Nudson et al unit is damaged or worn by contact with the drilling mud, it is necessary to either completely replace the entire measuring unit or to laboriously disassemble the unit so that damaged parts can be repaired or replaced.

Consequently, a need still exists for an accurate and durable distance measuring unit which will withstand the environment within a drill pipe and which will effectively measure the length of a drill pipe within a well.

DISCLOSURE OF THE INVENTION

It is a primary object of the present invention to provide a novel and improved depth measuring tool which is designed to operate internally of a drill pipe to provide an accurate measurement of well depth. The measuring tool is operable with the drill pipe in a wall so that measurement errors due to drill pipe stretch are eliminated.

Another object of the present invention is to provide a novel and improved drill pipe measuring tool having all movable counter drive components mounted within a sealed housing which is internally pressurized to compensate for the pressure of the drilling mud within the drill pipe being measured. The pressure within the sealed housing is equalized with changing well pressures at different depths to insure that drilling mud and other fluids are excluded from the sealed housing.

A further object of the present invention is to provide a novel and improved drill pipe measuring tool wherein all registers and register drive components are incorporated in a unitary, modular drive assembly which is easily removed from the remainder of the tool to facilitate rapid replacement of the drive assembly when maintenance is required.

Yet another object of the present invention is to provide a novel and improved drill pipe measuring tool which includes a register drive assembly operative to drive a distance register only during the descent of the tool into a drill pipe. If the tool is removed by wire line, the register drive disengages to prevent alteration of a reading registered during tool descent.

Another object of the present invention is to provide a novel and improved well pipe measuring tool which incorporates measuring instrumentation other than a distance measuring unit. The measuring tool may also include a downhole temperature sensing unit and/or a straight hole or attitude indicator to measure the angle of the drill pipe.

A still further object of the present invention is to provide a novel and improved well measuring tool having a shock absorbing nose assembly which is mounted for limited universal movement to guide the tool past discontinuities in the internal configuration of the drill pipe string. The nose assembly combines mechanical spring and hydraulic shock absorbing features to cushion the measuring tool upon impact with a bit or other obstruction at the lower end of the drill pipe. Fluid courses are formed externally on the nose assembly to permit drilling mud to pass around the measuring tool.

Other objects and advantages of the present invention will become apparent from a review of the following description and claims taken in conjunction with the accompanying drawings.

In accordance with the aforesaid objects, the present invention provides a drill pipe measuring tool having a casing with measuring instrumentation and a drive assembly for such measuring instrumentation sealed within the casing. The casing is provided with a pressure equalization system including a free floating piston to equalize the pressure within the casing with respect to varying external pressures to which the tool is subjected. All drive elements for the measuring instrumentation, with the exception of the drive wheels which must contact the well pipe, are sealed within the casing and immersed in oil or similar lubricating fluid which is not subject to substantial compression. The measuring instrumentation and the drive assembly therefor are formed into a single module which may be removably mounted within the housing and replaced as a single unit. The drive assembly operates to drive the measuring instrumentation only when the measuring tool is descending into a drill pipe and terminates all drive to the measuring instrumentation when the measuring tool reverses direction and ascends. Positive drive is provided by drive wheels which contact the interior wall of the drill pipe and which may be magnetized to eliminate slippage. These drive wheels are biased into engagement by spring loaded back up wheels which contact the pipe interior wall at a point substantially opposite to the point of contact of the drive wheels.

In addition to a distance measuring unit, the measuring tool may include a downhole temperature measuring unit as well as a downhole straight hole or attitude indicator. This measuring instrumentation is protected from shock when the drill pipe measuring tool impacts against a drill bit or other obstruction at the lower end of the drill pipe. This protection is provided by a shock absorbing nose assembly which combines mechanical spring and hydraulic shock absorbing units to cushion the measuring tool upon impact. The nose assembly is mounted upon the casing for limited universal movement to effectively guide the measuring tool past obstructions in the pipe, and includes externally formed fluid courses which permit drilling mud to pass around the measuring tool.

BRIEF DESCRIPTION OF THE DRAWINGS

FIG. 2 is an exploded view of the invention of FIG. 1;

FIG. 3 is a perspective view showing the bottom side of the measuring instrumentation and instrument drive module of FIG. 2;

BEST MODE FOR CARRYING OUT THE INVENTION

Figure 1:
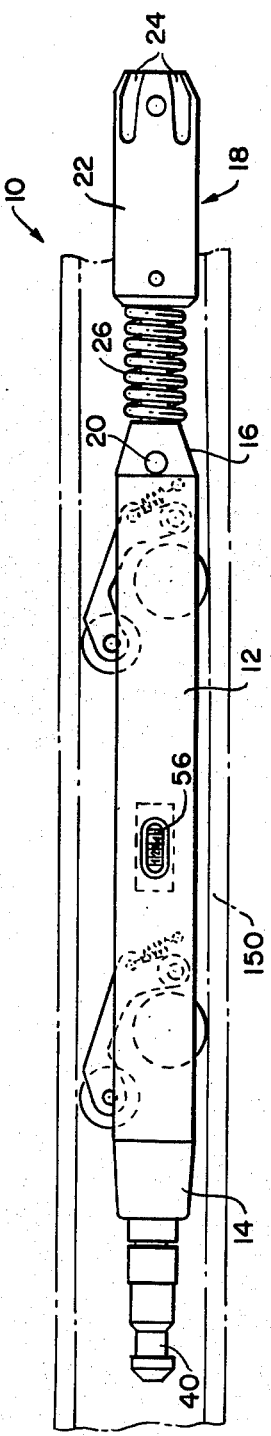
FIG. 1 is a view in front elevation of the drill pipe measuring tool of the present invention.

Referring now to the drawings, the drill pipe measuring tool indicated generally at 10 includes a substantially cylindrical body or housing 12 which is tapered inwardly at either end as illustrated at 14 and 16. A shock absorbing nose assembly 18 is secured to the downhole or lower end of the housing 12 by means of a lock bolt 20. This shock absorbing nose assembly includes a substantially cylindrical impact head 22 which is tapered at either end and is provided with longitudinally extending fluid courses 24 on the lowermost end thereof. The impact head is connected to the tapered end 16 of the housing 12 by a piston shaft 26 so that the impact head is capable of limited universal movement relative to the housing to guide the measuring tool 10 around obstructions in a drill pipe. As will be noted from FIGS. 1 and 2, one end of the piston shaft 26 is received within a socket 28 formed in the housing 12, and the piston shaft is retained in place by the lock bolt 20. To provide a limited universal movement of the piston shaft within the limits set by the diameter of the socket opening, the end of the piston shaft may be formed with a ball joint 30 which cooperates with the socket 28 to form a conventional ball and socket joint. Other known connections between the shaft 26 and the housing 12 may be employed so long as such connections permit limited universal movement of said shaft relative to the housing.

The outer end of the piston shaft 26 is provided with an enlarged piston end 32 which is sealed within a cylindrical piston chamber 34 formed centrally in the impact head 22 and opening at the upper end of the impact head. A drill mud passage 36 connects the lower end of the piston chamber with the exterior of the impact head. A shock absorbing spring 38 extends between the tapered end 16 of the impact head 22, and normally maintains the piston end 32 adjacent the upper end of the impact head. This permits the piston chamber 34 to fill with drilling mud through the drill mud passage 36 as the measuring tool 10 descends into a drill pipe.

The uppermost end 14 of the housing 12 receives a fishing neck 40 which is rigidly secured to the housing. The fishing neck may be formed integrally with the housing or may be removably secured thereto so that other tools may be attached in place of the fishing neck.

Referring now to FIG. 2, it will be noted that the housing 12 includes an upper housing section 42 and a lower housing section 44. The lower housing section includes spaced cutaway sections 46 and 48 positioned intermediate the tapered ends 14 and 16 thereof and on either side of a raised central section 50. The raised central section is provided with a flat top surface 52 and includes a recessed instrument chamber 54. The interior of the instrument chamber can be viewed through an enclosed window 56 formed in the central section (FIG. 1), and is connected to an opening in the exterior of the central section 50 by a pressure equalizing channel 58 which encloses a free floating piston 60. This piston is retained within the pressure equalizing channel for free longitudinal movement within the channel, and the peripheral edge of the piston is sealed against the interior wall of the channel.

The ends 14 and 16 of the lower housing section 44 are provided with recessed seats 62 and 64, each having a flat seating surface 66 and 68 respectively which extend in line with and in substantially the same plane as the flat top surface of the central section 50. Thus the flat top surface and the flat seating surfaces form supports for a unitary instrumentation and instrument drive module 70.

The instrumentation and instrument drive module 70 includes a unitary, flat support plate 72 upon which are rotatably mounted the stub shafts 74 and 76 for drive wheels 78 and 80 respectively. The stub shafts extend through the support plate and are sealed thereto by "O" ring seals or other conventional shaft seals (not shown). The outer end of each stub shaft extends beyond the outer surface of the drive wheel mounted thereon (FIG. 3), and the end surface of each stub shaft is concave in configuration as indicated at 82 to receive a ball bearing 84. Each ball bearing is mounted within a stub shaft receiving socket 86 and 88, such sockets being formed in the cutaway sections 46 and 48, respectively. With the instrumentation and instrument drive module 70 in place on the seating surfaces 66 and 68, the stub shafts 74 and 76 will project into the shaft receiving sockets and engage the ball bearings 84. The bearing tension of each ball bearing against the associated stub shaft may be adjusted by means of adjustment screws 90.

The drive wheels 78 and 80 are secured against rotation to the stub shafts 74 and 76 so that rotation of the drive wheel causes rotation of the associated stub shaft. The drive wheels are normally formed of steel or similar metal, and the outer contact surfaces thereof are grooved or knurled to increase frictional contact with the inner wall of a well pipe. This frictional contact is extremely important, as slippage of the drive wheels will cause error in the distance reading recording by the measuring tool 10. Since the surface of the drill pipe is subjected to drilling mud and other fluids, the maintenance of good frictional contact is often difficult. Consequently, the metallic drive wheels may be magnetized to create a magnetic force between the drive wheel and the metallic drill pipe and thus reduce the likelihood of slippage. Also, the peripheral edges of each drive wheel may be bevelled so that the wheel contact surface approximately matches the contour of the inner wall of the drill pipe. This bevelled drive wheel configuration insures that the drive wheel surfaces will wear evenly.

It will be noted from FIG. 2 that the drive wheels 78 and 80 are mounted adjacent the bottom surface of the flat support 72 and are received in the cutaway sections 46 and 48 of the lower housing section 44 when the support plate is in place on the recessed seats 62 and 64. Also, the bottom of the support plate mounts an instrument assembly 92 which extends into the recessed instrument chamber 54 when the support plate is in place. The instrument assembly may include only a distance registering counter 94, or it may include such counter in combination with one or more additional measuring instruments for sensing and registering downhole conditions. It is presently contemplated that such additional instruments will include a temperature sensing and registering unit 96 and a straight hole or attitude indicator 98. The temperature sensing and registering unit and the straight hole indicator are conventional units which will sense and register a condition. For example, the temperature sensing unit may constitute a digital or similar thermometer which will register the highest temperature encountered and will hold the temperature reading until reset. A conventional straight hole indicator constitutes a small pendulum within a casing which will mark angular attitude variations on a target chart. The distance registering counter and digital thermometer both provide a visual indication in the window 56, and may be rezeroed by a reset control 100 mounted on the exterior of the central section 50. This reset control may constitute any known reset for the instruments within the instrument chamber, and, for example, if the distance registering counter 94 is a mechanical gear driven counter, the reset control may constitute a screw operator for turning a reset gear which drives the counter in reverse.

The upper surface of the flat support plate 72 mounts the drive assembly 102 for a mechanical distance registering counter 94. This drive assembly includes a stub shaft bevel gear 104 secured against rotation to the end of each stub shaft 74 and 76 and oriented along the central axis of the associated stub shaft. These stub shaft bevel gears are engaged in driving relationship with drive bevel gears 106 which are mounted for sliding movement at opposite ends of a drive shaft 108. The opposite ends of the drive shaft are mounted for free rotation in spaced end shaft supports 110 and 112, and a central shaft support 114 supports the center of the drive shaft for rotation. The central shaft support and the end shaft supports are secured to the upper surface of the support plate 72 and maintain the drive shaft 108 in spaced, parallel relationship to the support plate. A gear 116 is secured against rotation to the drive shaft 108 adjacent the central support 114, and this gear extends through a slot 118 in the support plate to engage a counter drive gear 119 for the distance registering counter 94. Rotation of the gear 116 by the drive shaft 108 will result in rotation of the counter drive gear causing the distance registering counter to register a distance value.

Figure 5:
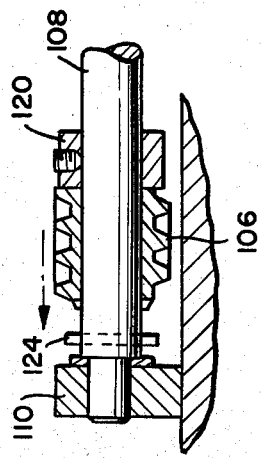
FIG. 5 is a sectional view showing a portion of the one way drive gearing of FIG. 4.
Figure 4:
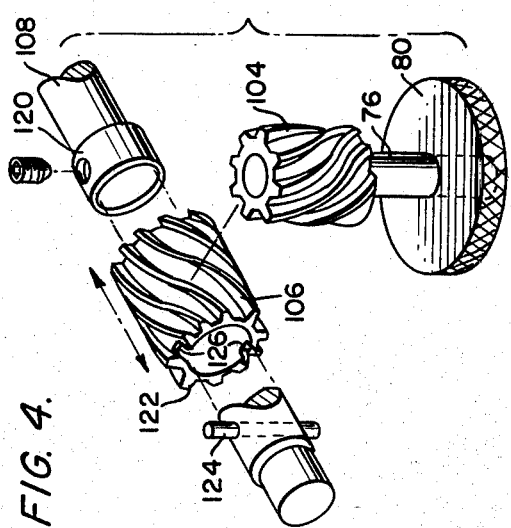
FIG. 4 is a fragmented perspective view showing a portion of the one way drive gearing of FIG. 2.

The rotation of the drive shaft 108 results only from rotation of the drive wheels 78 and 80 in one direction. The manner in which this is accomplished is best illustrated in FIGS. 4 and 5, wherein the driving action provided by the drive wheel 80 is illustrated. However, the drive wheel 78 and stub shaft 74 are associated with a drive mechanism identical to that illustrated in FIGS. 4 and 5. When the drive wheel 80 rotates in a counterclockwise direction, as will be the case when the pipe measuring tool descends into a drill pipe, the stub shaft 76 and the stub shaft bevel gear 104 also rotate in a counterclockwise direction. This causes the drive bevel gear 106 to slide away from a collar 120 which is secured to the shaft 108 in spaced relationship to the end shaft support 110 and to slide longitudinally along the drive shaft toward the end shaft support. This longitudinal movement of the drive bevel gear will continue as the stub shaft bevel gear rotates until the outer end 122 of the drive bevel gear contacts a pin which extends through the drive shaft 108. This pin inhibits further longitudinal movement of the drive bevel gear along the drive shaft, but the drive bevel gear continues to rotate under the influence of the rotating stub shaft bevel gear 104. Thus the end surface 122 of the drive bevel gear will rotate relative to the pin 124 until the pin becomes aligned with and moves into a drive slot 126 formed in the end surface of the drive bevel gear. Now the drive bevel gear operates through the pin 124 to drive the shaft 108, the gear 116, the gear 119, and the distance registering counter 94. When the measuring tool 10 is withdrawn from a drill pipe, the drive wheels 78 and 80 rotate in a clockwise direction. This drives the stub shaft bevel gears 104 in a clockwise direction and moves the drive bevel gears 106 away from engagement with the pins 124 and into engagement with the collars 120. The drive bevel gears now freely rotate against the collars 120, and no driving power is imparted to the drive shaft 108.

As shown in FIG. 3, the bottom of the support plate 72 rigidly mounts two projecting pivot pins 128 and 130 which are received in sockets 132 and 134 respectively formed in the cutaway sections 46 and 48 of the lower housing section 44. When the support plate is secured in place on the seating surfaces 66 and 68, the pivot pins extend through apertures 136 and 138 in the ends of biasing arms 140 and 142. These biasing arms freely pivot about the pivot pins 128 and 130 and are contoured to fit around the drive wheels 78 and 80 as illustrated in FIG. 1. A wheel or roller 144 is mounted for free rotation on the outer end of each of the biasing arms, and these wheels are designed to contact the inner wall of a drill pipe on the side opposite the points where the drive wheels 78 and 80 contact such wall. The biasing arms are biased outwardly from the lower housing section 44 by springs 146 which extend between pins 148 secured to the lower housing section and the biasing arms. Thus, the springs 146 normally bias the biasing arms 140 and 142 laterally outward from the housing 12. However, when the measuring tool is inserted into a drill pipe 150, the biasing arms and rollers 144 move to the dotted line position and force the drive wheels 78 and 80 tightly against the opposite side of the pipe.

To assemble the housing 12 of the distance measuring tool 10, the instrumentation and instrument drive module 70 is positioned upon the recessed seats 62 and 64 with the stub shafts 74 and 76 extending into the stub shaft receiving sockets 86 and 88 and the pivot pins 128 and 130 extending through the apertures 136 and 138 in the biasing arms and into the sockets 132 and 134. The instrument assembly 92 now projects into the recessed instrument chamber 54, and this chamber is sealed against the bottom of the flat support plate 72 by an annular gasket 152. The chamber does communicate with the top of the support plate by means of the slot 118 which is within the confines of the annular gasket.

With the instrumentation and instrument drive module in place, the upper housing section 42 can be mounted on the top surface of the support plate 72. The upper housing section is recessed as shown at 154 to provide a chamber for the drive assembly 102, and this chamber is sealed by gasket 156 extending annularly around the drive assembly. The lower housing section, flat support plate and upper housing section may now be securely bolted together by means of the aligned bolt holes shown in FIG. 2 However, before this is accomplished, the instrument chamber 54 and the recessed chamber 154 are filled with lubricating oil or other lubricating fluid to immerse the components contained therein.

INDUSTRIAL APPLICABILITY

In use, the drill pipe measuring tool 10 is inserted into a pipe 150 and permitted to drop by gravity to the bottom of the well. As the tool drops, the drive wheels 74 and 76 rotate in a clockwise direction to drive the distance registering counter 94. Also, external drilling mud is forced into the drill mud passage 36 and the pressure equalizing channel 58, and the piston 60 moves within the pressure equalizing channel in response to drilling mud pressure to vary the pressure of the lubricating oil in the instrument chamber 54 and the upper housing section chamber 154. Since these sealed chambers are joined by the slot 118, the total oil pressure within the housing 12 is equalized with the external drilling mud pressure as the tool 10 descends through different pressure zones. The universally movable shock absorbing nose assembly 18 operates to guide the tool over internal obstructions, such as pipe joints, which would often block the passage of a totally rigid tool. When the impact head 22 impacts against a drill bit or other obstruction at the end of the pipe, the piston 32 moves into the piston chamber 34 and ejects drilling mud from the drill mud passage 36. This provides a hydraulic shock absorbing action which combines with the compression of the shock absorbing spring 38 resulting from the movement of the piston to cushion the remainder of the tool 10 against the impact. The tool 10 may now be withdrawn from the pipe, but the reading on the distance counter is maintained since the counter is not driven by clockwise rotation of the drive wheels 78 and 80.

When wear or damage occurs in the counter drive components of the measuring tool 10, the housing 12 may be opened and the entire instrumentation and instrument drive module 70 can then be easily removed and replaced by a new module. This not only reduces expense by preserving the remaining components of the tool, but facilitates rapid tool repair since extra modules may be maintained at the well site.

I claim:

1. A distance measuring tool for measuring the length of a drill pipe within a well comprising housing means and measuring assembly means removably mountable as a unitary module within said housing means, said measuring assembly means including a unitary support, at least one measuring wheel rotatably mounted upon said support and extending outwardly beyond at least one peripheral edge of said support, distance measuring means mounted upon said support, and drive means mounted upon said support and operating to drive said distance measuring means in response to the rotation of said measuring wheel only during the descent of said measuring tool into a drill pipe.

2. The distance measuring tool of claim 1 wherein said drive means disengages from said distance measuring means during withdrawal of said distance measuring tool from a drill pipe.

3. The distance measuring means of claim 2 wherein a shock absorbing nose means is mounted upon one end of said housing means, said nose means being mounted for limited universal movement.

4. The distance measuring means of claim 3 wherein said shock absorbing nose means includes spring shock absorbing means in combination with hydraulic shock absorbing means.

5. The distance measuring tool of claim 4 wherein fluid courses are included in the face of the shock absorbing unit to facilitate the flow of mud therearound.

6. The distance measuring tool of claim 2 wherein the drive means includes at least one grooved, magnetized and bevelled measuring wheel to increase frictional and holding contact with the side of the drill pipe and thereby improve the accuracy of the distance measuring tool.

7. The distance measuring tool of claim 2 having a multiple instrument assembly means for carrying plural measuring instruments into the drill pipe in addition to said distance measuring means.

8. The distance measuring tool of claim 2 having a unitary instrument and drive module means for facilitating repairs and replacement thereof.

9. The distance measuring tool of claim 2 having a fishing neck means for attaching other tools to said distance measuring tool to carry them into the drill pipe and retrieve them therefrom.

10. The distance measuring tool of claim 5 having a multiple instrument assembly means for carrying plural measuring instruments into the drill pipe in addition to said distance measuring means and wherein the drive means includes at least one grooved, magnetized and bevelled measuring wheel to increase frictional and holding contact with the side of the drill pipe and thereby improve the accuracy of the distance measuring tool.

11. The distance measuring tool of claim 10 having a unitary instrument and drive module means for facilitating repairs and replacement thereof.

12. The distance measuring tool of claim 10 having a fishing neck means for attaching other tools to said distance measuring tool to carry them into the drill pipe and retrieve them therefrom.

13. The distance measuring tool of claim 2 having a multiple instrument assembly means for carrying plural measuring instruments into the drill pipe in addition to said distance measuring means and a unitary instrument and drive module means for facilitating repairs and replacement thereof and wherein the drive means includes at least one grooved, magnetized and bevelled measuring wheel to increase frictional and holding contact with the side of the drill pipe and thereby improve the accuracy of the distance measuring tool.

14. The distance measuring tool of claim 13 having a fishing neck means for attaching other tools to said distance measuring tool to carry them into the drill pipe and retrieve them therefrom.

* * * * *